(12) United States Patent
Jung

(10) Patent No.: US 6,416,437 B2
(45) Date of Patent: Jul. 9, 2002

(54) TRANSMISSION FOR HYBRID ELECTRIC VEHICLE

(75) Inventor: Hu-Yong Jung, Kwacheon (KR)

(73) Assignee: Hyundai Motor Company, Seoul (KR)

( * ) Notice: Subject to any disclaimer, the term of this patent is extended or adjusted under 35 U.S.C. 154(b) by 5 days.

(21) Appl. No.: 09/749,685

(22) Filed: Dec. 28, 2000

(30) Foreign Application Priority Data

Dec. 28, 1999 (KR) .............................. 99-63696

(51) Int. Cl.[7] .............................. F16H 3/72; F16H 37/06
(52) U.S. Cl. .................... 475/8; 475/5; 475/9; 180/65.2
(58) Field of Search .............................. 475/5, 8, 9, 2; 180/65.2, 65.4

(56) References Cited

U.S. PATENT DOCUMENTS

| | | | | |
|---|---|---|---|---|
| 5,495,906 A | * | 3/1996 | Furutani ..................... | 180/242 |
| 5,722,502 A | * | 3/1998 | Kubo ........................ | 180/65.2 |
| 5,773,904 A | * | 6/1998 | Schiebold et al. ......... | 180/65.2 |
| 5,842,534 A | * | 12/1998 | Frank ........................ | 180/65.2 |
| 6,007,443 A | * | 12/1999 | Onimaru et al. ........... | 180/65.2 |
| 6,048,289 A | * | 4/2000 | Hattori et al. ............. | 180/65.2 |
| 6,258,006 B1 | * | 7/2001 | Hanyu et al. ................ | 475/5 |
| 6,276,472 B1 | * | 8/2001 | Takashima et al. .... | 123/179.16 |
| 6,338,391 B1 | * | 1/2002 | Severinsky et al. ........ | 180/65.2 |

* cited by examiner

Primary Examiner—Christopher P. Schwartz
Assistant Examiner—Devon Kramer
(74) Attorney, Agent, or Firm—Birch, Stewart, Kolasch & Birch, LLP

(57) ABSTRACT

To improve acceleration performance on starting and in low speed ranges as well as minimizing energy loss with its simple structure of light weight and small size, a transmission for a hybrid electric vehicle includes a first motor connected to a battery through an iverter, the first motor functioning as a generator, a differential disposed between an engine and the first motor to provided driving force from one of the first motor and the engine, a final reduction gear engaged with the differential to transmit drive force to wheels, a second motor connected to the battery through the inverter to directly drive an axle shaft, a first one-way clutch disposed between the differential and the engine, and a second one-way clutch disposed within the differential.

3 Claims, 2 Drawing Sheets

TRANSMISSION FOR HYBRID ELECTRIC VEHICLE

BACKGROUND OF THE INVENTION (a) Field of the Invention

The present invention relates to a transmission for a hybrid electric vehicle (HEV) having a high acceleration performance on start and in low speed ranges as well as having a simple structure of light-weight and small-size, resulting in minimizing energy loss.

(b) Description of the Related Art

Hybrid electric vehicles (HEVs) were conceived as a way to compensate for the shortfall in battery technology of an electric vehicle. So, HEVs combine the internal combustion engine of a conventional vehicle with the battery and electric motor of an electric vehicle.

Typically, the HEVs are classified into series, parallel, and split types according to a power transmission structure.

The series type HEV uses an engine just as a generator for generating electricity for a battery pack so as to overcome the drawback of the electric vehicle having a short driving distance. That is, the driving force of the series type HEV comes entirely from the electric motor as in a purely electric vehicle. The series type HEV has a disadvantage in that a power loss occurs during a electricity/power conversion and an AC/DC conversion. However, the engine never idles, which reduces vehicle emissions.

The parallel type HEV has a direct mechanical connection between the engine and the wheels as in a conventional vehicle, but also has an electric motor that drives the wheels so as to provide extra power to the driveline when power assist is needed for climbing on a slope or for quick acceleration.

The split type HEV is a compromise type having advantages of both the series and parallel type systems for optimizing energy efficiency. FIG. 2 schematically shows a split type HEV.

The split type HEV comprises a battery 112, an inverter 114 for inverting DC (direct current) from the battery 112 into AC (alternating current), a motor 116 for converting electrical energy from the inverter 114 into mechanical energy, a planetary gear set 120 acting as a mechanical energy distributor, and a final reduction gear 124 for transferring the driving torque to wheels.

The planetary gear set 120 includes a sun gear 128, a ring gear 130 connected to the final reduction gear 124, and a few pinion gears 132 connected by a carrier 134 and circumferentially interposed between the sun gear 128 and the ring gear.

In the split type HEV, the electric motor supplies power when the vehicle is starting and running at a low speed, and it can easily reverse the vehicle by changing a rotation direction of the motor 116. The vehicle uses the power created from the engine in a normal driving state and the motor acts as a generator for regenerating the battery during the engine operation. The motor can also provide extra power to the wheels when a power assist is needed for quick acceleration.

The series and parallel type HEVs use continuously variable transmissions (CVTs), and the adoption of the CVT increases the vehicle's weight and causes energy loss through generating hydraulic pressure.

In the split type HEV, a planetary gear set interposed between the engine and the motor causes an increase in both the vehicle's weight and manufacturing costs.

SUMMARY OF THE INVENTION

The present invention has been made in an effort to solve the above problems of the prior art.

It is an object of the present invention to provide a transmission for a HEV capable of improving acceleration performance on starting and in low speed ranges as well as minimizing energy loss with its simple structure of light weight and small size.

To achieve the above object, the present invention provides a transmission for a hybrid electric vehicle comprising a first motor connected to a battery through an inverter, the first motor functioning as a generator, a differential disposed between an engine and the first motor to provided driving force from one of the first motor and the engine, a final reduction gear engaged with the differential to transmit drive force to wheels, a second motor connected to the battery through the inverter to directly drive an axle shaft, a first one-way clutch disposed between the differential and the engine, and a second one-way clutch disposed within the differential.

Preferably, the differential comprises a first drive pinion connected to the engine by the first one-way clutch, a second drive pinion having a first end connected to the first drive pinion by the second one-way clutch and a second end connected to the first motor, first and second driven pinions driven by the first and second drive pinions, respectively, and a carrier engaged with the first and second driven pinions to transmit power of the first and second drive pinions to the final reduction gear.

Preferably, the first one way clutch is designed to transmit clockwise rotational force from the engine to the first drive pinion, and the second one-way clutch is designed to transmit clockwise rotational force from the second drive pinion to the first drive pinion.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

DETAILED DESCRIPTION OF THE PREFERRED EMBODIMENTS

A preferred embodiment of the present invention will be described hereinafter with reference to the accompanying drawings.

Figure 1:
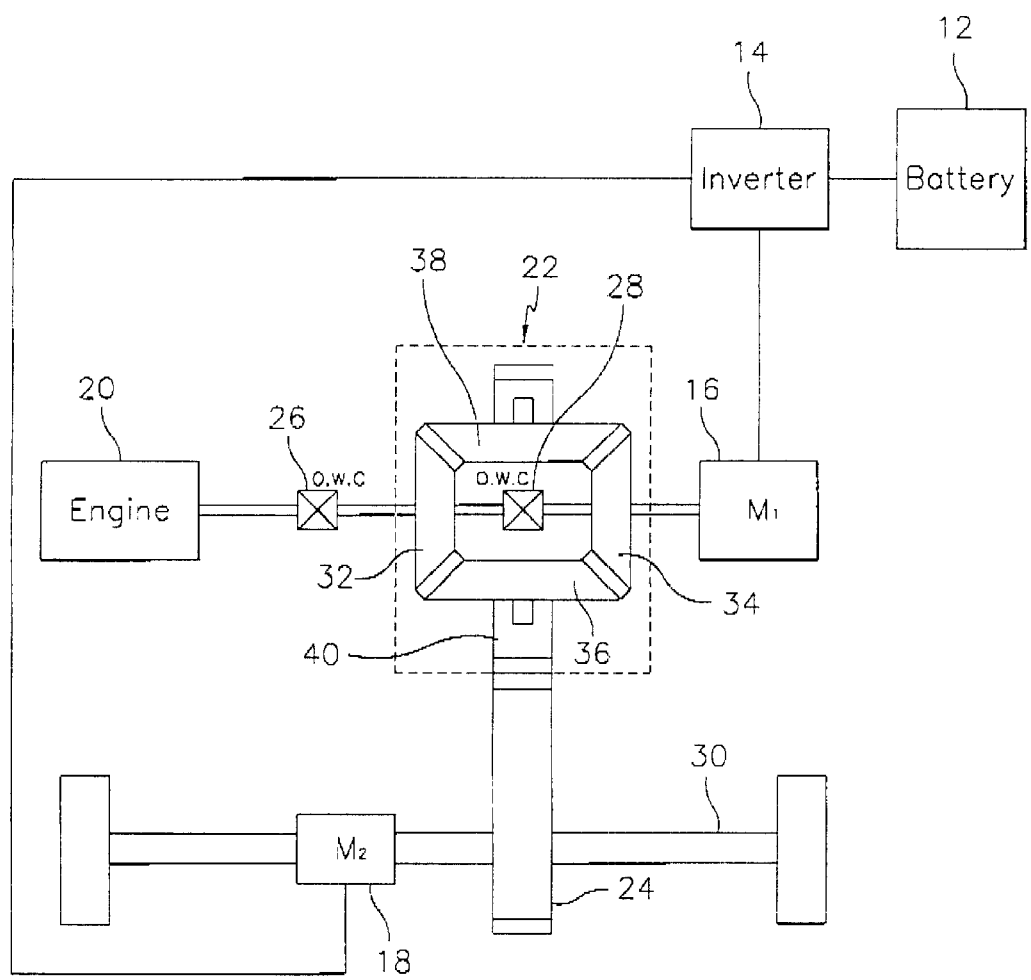
FIG. 1 is a simplified block diagram of an HEV equipped with a transmission according to a preferred embodiment of the present invention.
Figure 2:
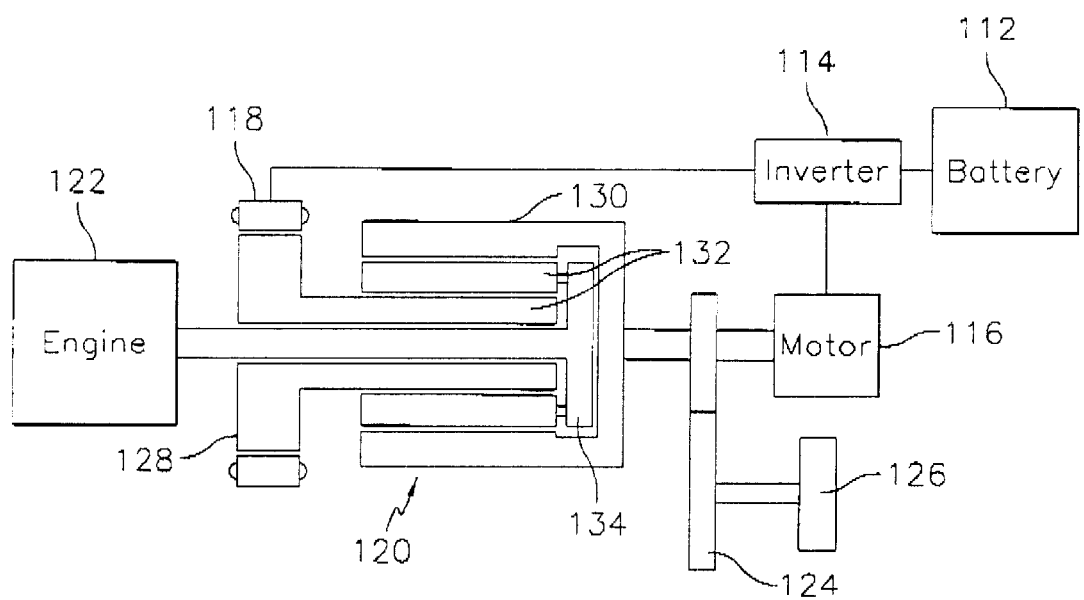
FIG. 2 is a simplified block diagram of an HEV equipped with a prior art transmission.

In FIG. 1, an HEV comprises a battery 12, an inverter 14 for inverting direct current (DC) of the battery 12 into alternating current (AC), two motors 16 and 18 and a combustion engine 20 for providing driving torque, a final reduction gear 24 engaged with a differential, and first and second one-way clutches 26 and 28.

The battery 12 is preferably one of a Ni-MH battery and a Li-ion battery that is widely used for the HEV.

The motors 16 and 18 convert electric energy of the battery into mechanical energy to drive the differential 22 and the axle shaft 30, respectively. The motors 16 and 18 also function as generators that convert mechanical energy generated during the shifting and braking operations into electric energy to recharge the battery.

To drive the final reduction gear 24 by coupling power from both the engine 20 and the first motor 16, a power coupling manner is used in this embodiment. That is, the differential 22 is disposed between the first motor 16 and the engine 20, and the one-way clutch 26 is disposed between the differential 22 and the engine 20. The one-way clutch 28 is disposed in the differential 22.

Describing more in detail, the differential 22 includes a first drive pinion 32 connected to the engine 20 by the one-way clutch 26, a second drive pinion 34 having a first end connected to the first drive pinion 32 by the one-way clutch 28 and a second end connected to the first motor 16, first and second driven pinions 36 and 38 driven by the first and second drive pinions 32 and 34, and a carrier 40 engaged with the driven pinions 36 and 38 to transmit power of the first and second drive pinions 32 and 34 to the final reduction gear 24.

The one-way clutch 26 is designed to transmit clockwise power from the engine 20 to the first drive pinion 32, and the one-way clutch 28 is designed to transmit clockwise power from the second drive pinion 34 to the first drive pinion Accordingly, when the vehicle is accelerated, since the second drive pinion 34 rotates clockwise by the first motor 16, the rotational power is transmitted only to the first drive pinion 32 but not to the engine. In a normal operation of the vehicle, since the power transmission shaft (i.e., crankshaft) of the engine rotates clockwise, the rotational power of the power transmission shaft is transmitted only to the first drive pinion 32 but not to the second drive pinion 34 and the first motor 16. During the normal operation of the vehicle, the rotation of the first motor 16 is controlled in connection with the rotations of the engine and the second motor.

The power transmission of the above described power transmission system will be described hereinafter.

First, when the vehicle starts or runs at a low speed, only the first and second motors 16 and 18 are driven by the battery. That is, the first motor 16 drives the differential 22, and the second motor 18 drives the axle shaft 30. Accordingly, the vehicle speed depends on a control logic associated with the first and second motors. At this point, the driving force through the first motor 16 is transmitted to the first drive pinion 32 synchronized with the second drive pinion 34 by the second one-way clutch 28. Here, the engine 20 operation is initiated by a starter motor.

When the vehicle is accelerated above a predetermined speed such that the rotational number becomes higher than that of the first motor 16, the differential 22 is driven by the engine 20, while the axle shaft 30 is continuously driven by the second motor 18. Here, the first motor 16 is rotatable in both directions (forward and reverse directions) according to the rotational numbers of the engine 20 and the second motor 18. When the first motor 16 rotates in the reverse direction, this functions as a generator for recharging the battery.

When braking force is applied to the vehicle, since the revival braking force is generated on the second motor 18, the second motor 18 functions as a generator.

Since the above described HEV is designed to transmit power using a differential and a one-way clutch, the structure thereof is simpler than a conventional one employing a continuously variable transmission and a planetary gear unit to transmit power. Accordingly, the HEV according to the present invention is capable of improving acceleration performance on starting and in low speed ranges as well as minimizing energy loss with its simple structure of light weight and small size.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A transmission for a hybrid electric vehicle comprising:
 a first motor connected to a battery through an inverter, the first motor functioning as a generator;
 a differential disposed between an engine and the first motor to provide driving force from one of the first motor and the engine;
 a final reduction gear engaged with the differential to transmit drive force to wheels;
 a second motor connected to the battery through the inverter to directly drive an axle shaft;
 a first one-way clutch disposed between the differential and the engine; and
 a second one-way clutch disposed within the differential.

2. The transmission of claim 1 wherein the differential comprises a first drive pinion connected to the engine by the first one-way clutch, a second drive pinion having a first end connected to the first drive pinion by the second one-way clutch and a second end connected to the first motor, first and second driven pinions driven by the first and second drive pinions, respectively, and a carrier engaged with the first and second driven pinions to transmit power of the first and second drive pinions to the final reduction gear.

3. The transmission of claim 2 wherein the first one way clutch is designed to transmit clockwise rotational force from the engine to the first drive pinion, and the second one-way clutch is designed to transmit clockwise rotational force from the second drive pinion to the first drive pinion.

* * * * *